Figure 5:
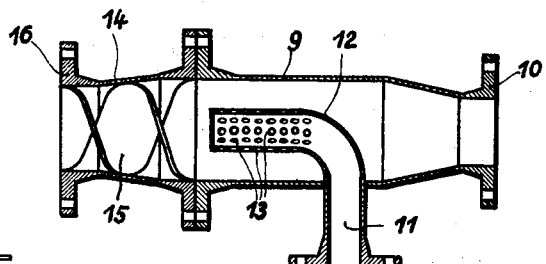

United States Patent Office 2,808,317
Patented Oct. 1, 1957

2,808,317

PROCESS AND APPARATUS FOR THE RECOVERY OF SULPHUR FROM HYDROGEN SULPHIDE

Adolf Schmalenbach, Herbert Pummer, and Joseph Daniels, Essen, North Rhine-Westphalia, Germany, assignors, by mesne assignments, to Koppers Company, Inc., Pittsburgh, Pa., a corporation of Delaware Application February 23, 1951, Serial No. 212,382

6 Claims. (Cl. 23—262)

It is known that elementary sulphur can be recovered from hydrogen sulphide or gases containing the same, for example the waste gases of plants for the purification of coal distillation gas, by reacting the hydrogen sulphide with a limited quantity of oxygen (in the form of air) according to the equation $H_2S + 1/2O_2 \rightarrow S + H_2O$. According to the proposal of F. C. Claus this reaction is carried out in the presence of a catalyst, for example, bauxite.

The aforesaid reaction is exothermic and in order to prevent an undesirable increase in the reaction temperature and the temperature of the catalyst the heat evolved in the reaction must be dissipated. This has generally been achieved hitherto by carrying out the reaction in a large container with walls and a cover of high heat conductivity. Such apparatus is generally known as a Claus kiln.

The classical Claus kiln has, however, a number of substantial disadvantages. Thus its charge is small in comparison to the space required. It employs large reaction chambers filled with an explosive gas-air mixture, which present a considerable danger of explosions, since the reaction is effected most favourably at temperatures comparatively near the explosion limits.

These disadvantages may be partially avoided by employing the following stages of reaction:

(1) $H_2S + 3/2O_2 \rightarrow SO_2 + H_2O$ (2) $SO_2 + 2H_2S \rightarrow 3S + 2H_2O$ Thus the hydrogen sulphide is partially burnt with a relatively large quantity of air in order to form $SO_2$, this being effected for example, in a gas-air burner of the normal kind. As this $SO_2$ formation is strongly exothermic a complete conversion of the $H_2S$ into $SO_2$ may be effected with safety. The reaction gas is quickly cooled and is then mixed with the residual hydrogen sulphide and brought into contact with the catalyst at a favourably low temperature. A boiler may be used for example for cooling the hot $SO_2$ gas.

As an alternative, it has also been proposed to burn the total quantity of hydrogen sulphide gas with a limited quantity of air in accordance with the equation $H_2S + 1/2O_2 \rightarrow S + H_2O$, with regard to the fact that the temperature of the reaction material rises beyond the most favourable temperature for the catalytic reaction. The hot gases resulting from the combustion were cooled in a boiler or the like to the optimum temperature for the catalytic reaction and the latter was then carried out in a second stage of the process.

Both methods of operation completely avoid the danger of explosion and may be carried out in comparatively small apparatuses.

Both the classical Claus process as well as the aforesaid improved processes suffer however, from a further substantial disadvantage.

The gases containing hydrogen sulphide which are industrially available generally contain as impurities nitrogen compounds particularly cyanogen compounds and ammonia. These nitrogen compounds form ammonium sulphate and the like with the sulphur-oxygen compounds resulting from the reaction and these mix with the elementary sulphur formed and change it into a thick viscous fluid, thereby hindering its removal from the apparatus. The amount of such ammonia-sulphur-oxygen compounds formed is, as is known, under unfavourable conditions sometimes considerably greater than the yield of elementary sulphur.

In order to overcome this disadvantage it has been proposed to decompose the nitrogen compounds of the hydrogen sulphide gas into their elements by heating to a high temperature preferably above 1000° C. For this purpose the untreated gas was reacted with the added air in a reaction chamber protected against heat losses, in which the desired high temperature (above 1000° C.) could be maintained. The gases issuing from the reaction chamber at high temperature were led over the catalyst and then quickly cooled, for example in a boiler, the sulphur formed being precipitated. In this way a yield of about 75% of elementary sulphur was obtained and it was possible from the residual gas to recover by a further catalytic treatment, a further quantity of sulphur.

The disadvantage with this process, however, is that the sulphur which is precipitated in the boiler or other cooler occurs in an undesired modified form which is recognisable by the brown to dirty-yellow colour.

The invention consists in that the total amount of gas containing hydrogen sulphide is first of all reacted with oxygen at a high temperature somewhat above 1000° C. and that the reaction mixture is cooled, before being brought into contact with the catalyst operating in the temperature range somewhat below 400° C., so that condensation of the elementary sulphur to liquid state does not take place and the total sulphur vapour formed by the reaction at high temperature and the subsequent cooling is led through the last contact stage at a temperature of about 400° or less in which the remainder of the $SO_2$ and $H_2S$ contained in the reaction gas is reacted.

By this method of operation the total quantity of sulphur is obtained in the valuable pure yellow form and free from undesired impurities, and in particular free from ammonium sulphate, and the yield may amount to 95% of the sulphur contained in the gas forming the starting material.

The high temperature necessary for the decomposition of the undesired nitrogen compounds may be very readily obtained so long as the starting gas has a sufficiently high concentration of $H_2S$ or combustible constituents, for example a concentration of more than 65%. If the $H_2S$ content is smaller, preheating of the air must be provided.

Instead of this, or in addition thereto, a further characteristic of the invention provides for increasing the oxygen content of the added air, for example by the addition of pure or highly concentrated oxygen.

A further improved characteristic of the invention consists in also providing the catalysts within the boiler forming the cooler, for example in the flues of a tube boiler. As a result of this an increase in the sulphur vapour formation is obtained before the entry of the reaction media in the last catalyst stage or stages and a corresponding reduction in the load thereon is obtained.

In order to cool the sulphur vapour quickly in the last stage of the process to below the condensation temperature the invention provides, according to a further characteristic, for a surface cooling on wall surfaces which are indirectly maintained, preferably by gases, at such a temperature that the precipitating sulphur is not cooled below its melting or solidification point.

The invention preferably employs a hydrogen sulphide gas containing 30–55% and preferably 40–45% of hydrogen sulphide. It has been shown that gases of such composition produce the highest yield of elementary sulphur even in the primary stage which—as described—operates at a relatively high temperature.

By the increased formation of elementary sulphur in the first stage or stages of the process there is obtained the advantage of a reduction in the demand on the final stage of the process which operates at relatively low temperature and the maintenance of the favourable reaction temperature is thereby facilitated.

Figure 1:
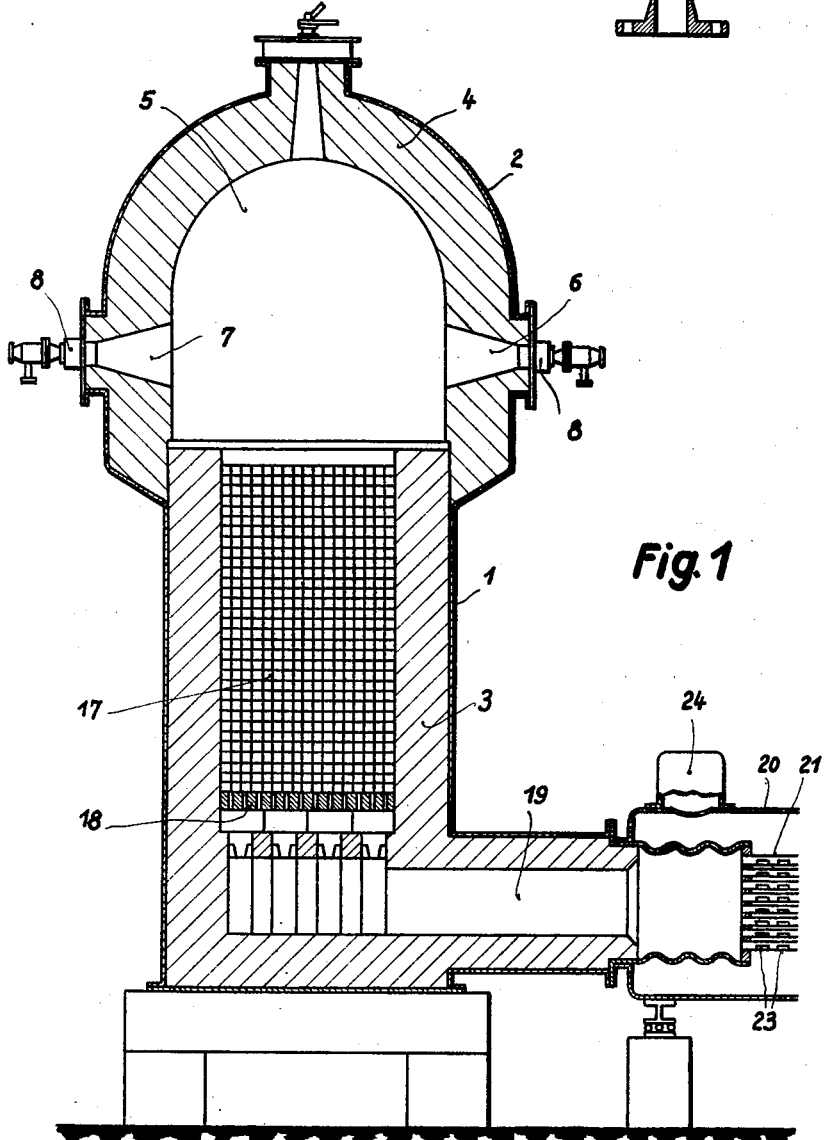
Figure 2:
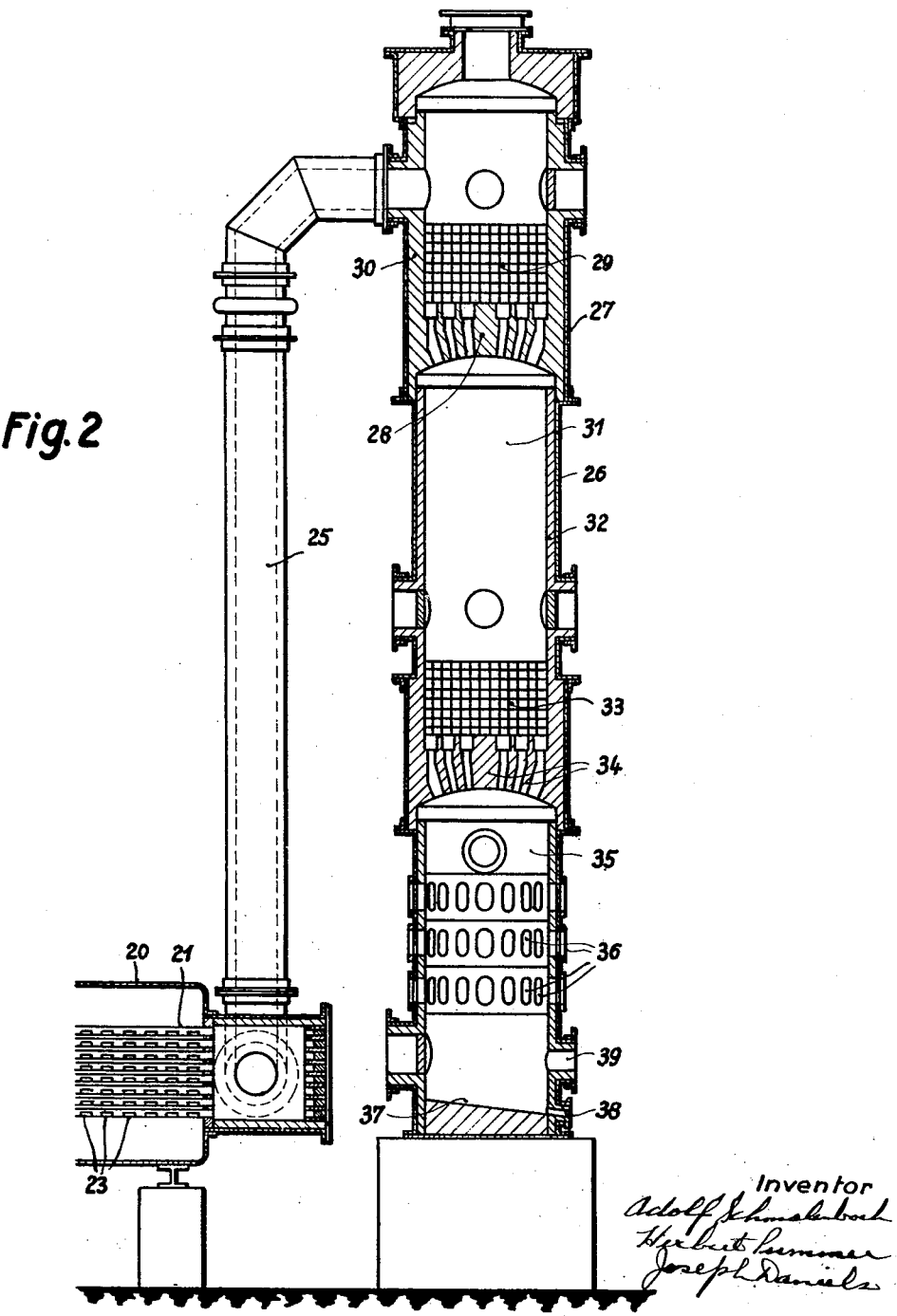
Figure 3:
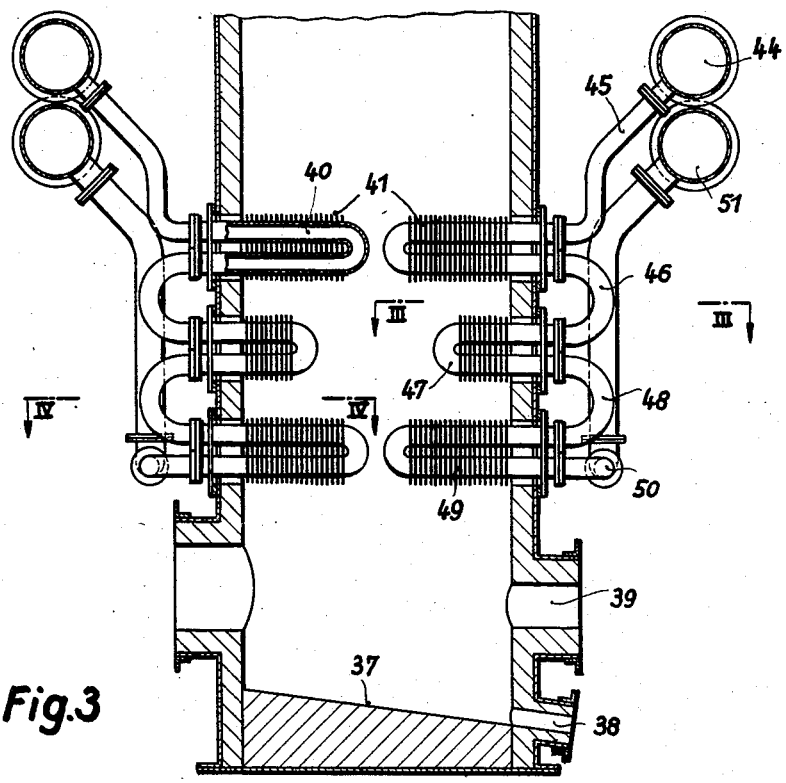
Figure 4:
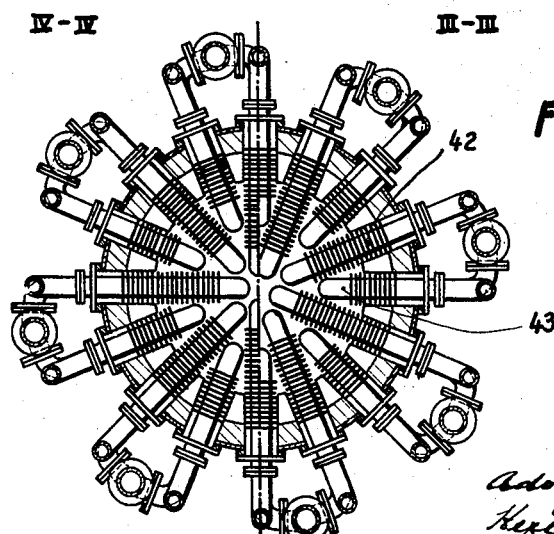

Reference will now be made to the accompanying drawings in which:

Figs. 1 and 2 show vertical sections of an apparatus constructed according to the invention, Fig. 3 shows on a larger scale a vertical section through the lower part of the catalyser tower 26 according to Fig. 2, Fig. 4 is a horizontal section partly on the line 4—4 and partly on the line of 3—3 of Fig. 3, and Fig. 5 shows on a larger scale a section through the gas mixing device 9 for introducing the gases to the first stage in tower 1.

The device illustrated in Figs. 1 and 2 of the drawings comprises a reaction tower 1 for the primary action, a boiler 20 for cooling the reaction gases produced at high temperature, and a catalyser tower 26 for the conversion of the hydrogen sulphide still contained in the reaction gases leaving the first stage of the process.

The reaction chamber of the first stage of the process consists of a substantially cylindrical metal housing 1 which extends at its upper end into a closure hood 2 of larger diameter. The housing 1 and the cover 2 are lined with refractory brickwork 3 and 4, the junction between the brickwork 3 and the brickwork 4 being so arranged that the brickwork 3 on heating can expand upwardly without disturbing the brickwork 4.

Opening laterally into the free cover space 5 are, for example, two conical burner openings 6, 7 at the base of which there are arranged suitable burners 8, for example burner bricks with a plurality of burner passages.

A mixture of air, or gas with a greater oxygen content than air, and gas containing hydrogen sulphide is introduced into the burners 8. The mixing device comprises—as can be seen from Fig. 5—a housing 9 which is preferably cooled and is of tubular construction having a flange 10 to which is connected the supply pipe for the hydrogen sulphide gas.

The air or oxygen supply is indicated at 11 and is formed with a surved part 12 which projects into the housing 9. This curved part is formed with a series of openings 13 so that the oxygen containing gas can be admixed with the hydrogen sulphide containing gas in a state of fine distribution.

The mixture then passes into the housing part 14 which is provided with helical guides 15 so that the gases are set in rotation and the formation of the mixture is correspondingly improved. The burner brick or the housing thereof is secured to the flange 16.

The gases react in the chamber 5 which is maintained at high temperature, and whose refractory brickwork is provided with a corresponding heat insulation, heat being developed during this stage of the process. The hydrogen sulphide is partly changed into sulphur vapour and partly into sulphur dioxide whilst a residual quantity of hydrogen sulphide remains unaltered.

The reaction mixture then passes through the contact mass 17 arranged in the vertical part of the housing 1, this mass being supported in layers on the grate 18. This contact mass consists of a material resistant to high temperatures, preferably a ferrous material of the largest possible surface area.

The gases pass downwardly through the contact mass 17 whereby a further quantity of sulphur vapour is formed. The mixture then passes through the connecting passage 19 into a boiler 20 which is provided with flues 21 in which, as indicated at 23, contact bodies are likewise arranged, for example in the form of tubular members smaller than the cross section of the flues.

The gases are strongly cooled in the boiler 20 with the production of high pressure steam which can be withdrawn from the steam dome 24. The reaction media then flow at a temperature above the condensation point of sulphur vapour through the pipe 25 up into the contact tower shown in Fig. 2.

As can be seen from Fig. 2 the housing 26 of the contact tower consists of several housing parts arranged in a series of stages. In the upper widened part 27 a surface for the contact mass 29 corresponding to the grate 18 is provided by means of the arched brickwork division 28. The contact mass 29 in this case preferably consists of bauxite or the like. The brickwork 30 is in this case so selected that the heat of the reaction is conducted away and the reaction temperature does not in general exceed 400° C.

After flowing through the bauxite contact mass 29 the reaction media pass into the free space 31 the brickwork 32 of which is of such dimensions that a further effective cooling of the media takes place.

The reaction media then come into contact with the contact mass 33 arranged on the grate 34 constructed as an intermediate division. Thereafter in the lower part 35 of the contact tower the gases come into contact with the cooling elements 36, (the construction of which will be described in more detail later), on the surface of which the reaction media cool below the condensation point of sulphur vapour so that the sulphur contained in the gas is separated in liquid form. The liquid sulphur accumulates on the base 37 of the contact tower and can be removed therefrom through the opening 38. The residual gases are withdrawn through the conduits 39 for use as desired. They may also be discharged into the atmosphere.

The construction of the cooling elements can be seen from Figs. 3 and 4. As shown in Fig. 3 the cooling elements consist of hair-pin shaped bent cast iron pipes 40 which are provided with external cooling ribs or fins 41 in order to increase the effective cooling surface thereof. As shown in Fig. 4 the arrangement is such that adjacent each long cooling element 42 extending radially in to the center of the cooling chamber there is a shorter radial cooling element 43. In this way, the radial cooling elements are uniformly distributed over practically the entire cross section of the reaction tower, so that the most effective cooling possible is obtained.

Preferably, several series of such cooling pipes are arranged above each other as shown in Fig. 3.

Externally, the top-most cooling elements are connected with a cold air supply 44 through the branch pipes 45. The exhaust air of the topmost cooling elements is then passed through the bent pipe 46 into a cooling element 47 of the middle series and then through the bent pipe 48 into a cooling element 49 of the lower cooling series from whence the heated exhaust air escapes through the pipe 50 into the exhaust air collecting pipe 51. A ventilator, fan or blower, not shown on the drawing, serves to keep the cooling air in motion.

In the operation of the plant it is essential that the housing 26 of the contact tower is as far as possible, kept at all points at a temperature above the dew point of water so that the formation of condensates containing sulphurous acid, hydrogen sulphide and the like is avoided. Should the temperature at one part of the housing be too low heat insulation is preferably provided externally at the corresponding part, the insulation being made removable in order that it may be adapted to the prevailing ambient temperature during operation of the contact tower.

What we claim is:

1. In apparatus for recovery of sulphur from gases comprising a primary reaction stage composed of an upper burning chamber portion having means for introducing H₂S containing gas and air for combustion therein, and a lower contact chamber filled with packing for off-flow of the burning gases from the H₂S burning chamber portion, a secondary reaction stage composed of an upper catalyst chamber filled with catalytic material and a cooling chamber below the same for off-flow of gases from the catalytic chamber, and a cooler communicably connecting the contact chamber and the catalytic chamber for cooling the gases from the contact chamber of the primary stage before they pass to the catalytic chamber of the secondary stage, the combination of a further cooling chamber below the aforesaid cooling chamber in the secondary stage with radial U-shaped metal pipes extending crosswise into the cooling chamber of the secondary reaction stage from its perimeter for cooling the reaction gas in flow therethrough, the pipes extending in to the center of the cooling chamber of the secondary stage, and the outer ends of the pipes being connected outside the cooling chamber with means for supplying thereto and withdrawing therefrom cooling air, means for withdrawing liquid sulphur off from below said pipes, and means for withdrawing the residual gases off from below said pipes but above the means for withdrawal of the liquid sulphur.

2. Apparatus as claimed in claim 1, and in which the radial U-shaped metal pipes comprise superposed annular rows of the U-shaped pipes, each row comprising long and short pipes with the short pipes alternating in position side by side with the long pipes, the latter of which extend closer to the center than the short pipes, and the pipes being spaced from each other for passage of gas over the pipes.

3. Apparatus as claimed in claim 2, characterized in that the U-shaped cooling pipes are comprised of resistant cast iron pipes with external cooling fins thereon.

4. In apparatus for the recovery of sulphur from gases, comprising: a primary tower having a lower contact chamber filled with contact material and an upper chamber of larger diameter and of unobstructed free space on the interior of the upper chamber, said chambers being lined to retain the heat of reaction within the chambers; means for introducing the reactant gases into the upper chamber; a waste heat boiler connected with said chambers below the catalytic chamber for off-flow of reactant gases therefrom through the waste heat boiler, said boiler having catalytic material in the gas off-flow flues thereof; a secondary tower comprising an inlet to the upper part thereof connected to the waste heat boiler flues to receive therefrom the off-flow reaction gases of the primary tower, a portion of the upper portion of the secondary tower below the inlet being filled with catalytic material for secondary reaction of the gases from the inlet, an unobstructed free space below said catalytic material in said secondary tower, and a portion of the tower below said free space being also filled with contact material, all said spaces being lined to readily dissipate the heat therefrom; a liquid sulphur receptacle and a lower outlet therefrom for liquid sulphur and an upper outlet for residual gases in the lower portion of the tower and a cooling chamber in said tower above the gas outlet and below its lower contact material, said cooling chamber comprising crosswise radial U-shaped metal pipes extending into the same from its perimeter to its center, the outer ends of the pipes being connected outside the tower with means for supplying thereto and removing therefrom cooling air.

5. Apparatus as claimed in claim 4, and in which the radial U-shaped metal pipes comprise superposed annular rows of the U-shaped pipes, each row comprising long and short pipes with the short pipes alternating in position side by side with the long pipes, the latter of which extend closer to the center than the short pipes, and the pipes being spaced from each other for passage of gas over the pipes.

6. Apparatus as claimed in claim 5 characterized in that the U-shaped pipes are provided with spaced external cooling fins thereon.

References Cited in the file of this patent

UNITED STATES PATENTS

| Number | Name | Date |
|---|---|---|
| 398,966 | Hunter | Mar. 5, 1889 |
| 1,064,775 | Row | June 17, 1913 |
| 2,200,529 | Baehr et al. | May 14, 1940 |
| 2,258,305 | Stirlen | Oct. 7, 1941 |
| 2,330,844 | Rover | Oct. 5, 1943 |
| 2,386,390 | Fernelius et al. | Oct. 9, 1945 |
| 2,403,451 | Nevins et al. | July 9, 1946 |
| 2,497,095 | Nevins et al. | Feb. 14, 1950 |
| 2,534,792 | Nevins et al. | Dec. 19, 1950 |